United States Patent [19]
Gingerich

[11] Patent Number: 6,089,341
[45] Date of Patent: *Jul. 18, 2000

[54] ELECTRIC POWERED VEHICLE

[76] Inventor: Newton Roy Gingerich, 565 Snyders Road East, Baden, Ontario, Canada, N0B 1G0

[ * ] Notice: This patent is subject to a terminal disclaimer.

[21] Appl. No.: 09/067,001

[22] Filed: Apr. 27, 1998

Related U.S. Application Data

[63] Continuation-in-part of application No. 08/545,863, Nov. 13, 1995, Pat. No. 5,743,347.

[30] Foreign Application Priority Data

May 15, 1993 [GB] United Kingdom .................... 9310036
Jan. 13, 1994 [WO] WIPO ...................... PCT/CA94/00232

[51] Int. Cl.[7] ................................................. B60K 1/02
[52] U.S. Cl. ........................................ 180/65.1; 180/2.2
[58] Field of Search .................................... 180/65.1, 2.2, 180/65.5, 65.6, 291, 292, 6.48, 6.5

[56] References Cited

U.S. PATENT DOCUMENTS 4,415,049  11/1983  Wereb ...................................... 180/6.5
5,743,347   4/1998  Gingerich .............................. 180/65.1

*Primary Examiner*—Richard M. Camby
*Attorney, Agent, or Firm*—Anthony Asquith & Co.

[57] ABSTRACT

The lawn and garden tractor has independent electric motors for both driven wheels. The motors are combined with reduction gearboxes, and the wheel is mounted on the output shaft of the gearbox. There is no mechanical axle connection. The power to the motors is controlled by an automatic controller as to wheel speed, power being increased/decreased in accordance with whether the wheels are under-running or over-running relative to manually-controlled speed setting. Steering is controlled by potentiometer on a mechanical steering wheel, or by joy-stick control. The joystick may be on the tractor, or remote. The drive system is suitable also for four-wheel drive.

21 Claims, 3 Drawing Sheets

ELECTRIC POWERED VEHICLE

This application is a continuation in part of Ser. No. 08/545,863 filed Nov. 13, 1995 now U.S. Pat. No. 5,743,347.

This invention relates to the manner of providing and controlling power transfer from a battery pack to the electric drive motors, and to the road wheels of an electric vehicle such as a lawn and garden tractor.

Such vehicles are common and are powered by gasoline or engines, but are not economical or efficient. The noise, fumes, etc of a gasoline tractor can be obtrusive to many users, especially since many lawn and garden tractors are used around buildings and people. Several attempts have been made to provide an electric tractor, with re-chargeable batteries, in that size range.

Given that a lawn and garden tractor is purchased because the lawn and garden is quite sizeable, and therefore the tractor will be subjected to a demanding duty cycle, it is recognised that there is sufficient space on a small tractor to contain the quantity of batteries needed for the duty cycle, if used economically. That is to say, the size available for the battery pack is sufficient for the typical heavy duty cycle, but only if the power is utilised efficiently.

In previous designs of small tractor, the power to the drive motors has been controlled, as to the speed of the wheels, by means of switched resistors. This type of control does not use the electricity economically, in that some of the power goes in heating the resistors; it is also mechanically jerky; and it also has the disadvantage that the control system employs small moving parts which can pose a service problem, given that a lawn and garden tractor can suffer long periods of mechanical neglect.

In previous designs of small electric tractors, the mechanical drive from the electric motor to the road wheels has been complex, involving drive axles, chain drives and sprockets, final drive units, differential gears, etc.

The present invention is aimed at providing a power, and power control, system for a vehicle, in which the system uses solid state components, with no exposed moving parts (other than the road wheels). In the present invention, individual motors are provided for each driven road wheel. Preferably, each motor feeds power to its road wheel through a respective simple parallel-shaft, enclosed, speed-reduction gearbox, and the road wheel is attached directly to the output shaft of the gearbox.

The road wheels preferably are mounted directly on the output shafts of gearboxes connected directly to, and housed with, the drive motors. The driven wheels are not connected by means of a drive axle, and no differential gear or final drive unit is required.

In the invention, the left drive motor drives the left road wheel and the right drive motor drives the right drive wheel. The drive control system is such that each motor is driven to rotate at a particular speed. The motor is supplied with the current or power it needs to maintain that speed, even if load conditions should vary. Thus, the tractor tends to travel in a straight line at a constant speed, or a steered curve, even if one wheel should encounter a small obstacle. Also, the tractor maintains wheel speed even if one wheel should tend to slip when running over a low-grip surface.

Preferably, the motors are arranged to feed energy back into the batteries if the wheels are over-running the motors (when the tractor is decelerating, for example.) Such regenerative braking provides a useful improvement in overall efficiency. Not only that, but an electric tractor contains a battery pack of considerable mass, and the inertia of the tractor might make close manoeuvring a little difficult if the tractor were able to run on during over-run. The resistance on over-run caused by regenerative braking substantially improves the feel of the controls, whereby the driver does not fuel that the tractor is running away with him.

Besides, on a lawn and garden tractor, braking requirements are not very demanding, and providing regenerative braking means that the only other braking required, if indeed any other is required, can be met by a rudimentary parking brake which can be incorporated into the gearbox if desired.

DETAILED DESCRIPTION OF PREFERRED EMBODIMENT

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
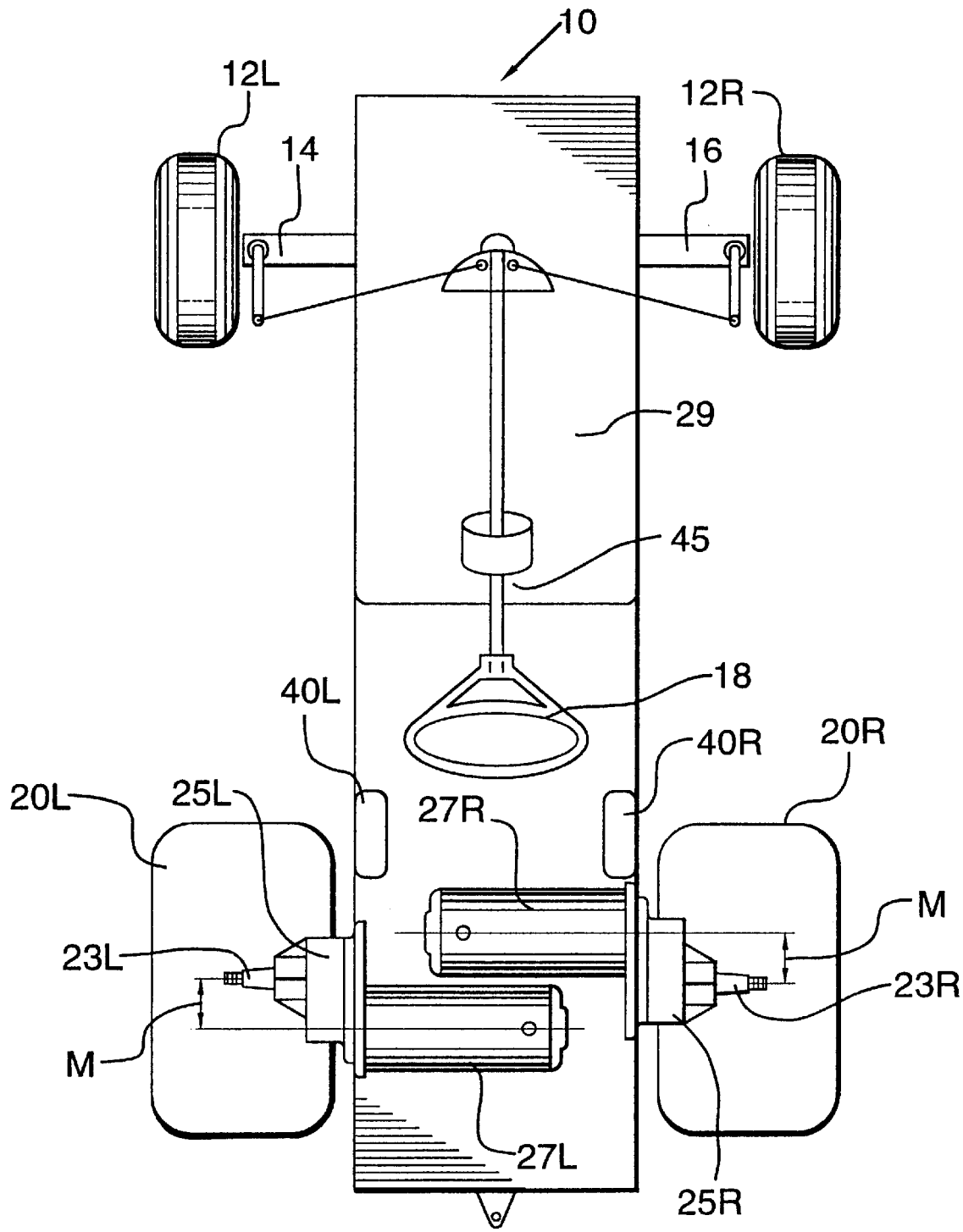
FIG. 1 is a diagrammatic view showing, in plan, a small tractor, of the type generally referred to as a lawn and garden tractor, having a drive system which embodies the invention.

FIG. 1 shows a tractor 10 having a conventional steering system. The non-driven wheels 12L,12R are mounted at the ends of an axle 14, and are swivel-able about king-pins 16. A steering wheel 18 turns the wheels 12L,12R for steering, as will be apparent from the diagram.

The driven wheels 20L,20R are not mounted on a common axle. Each wheel has its own axle 23L,23R, which is mounted directly in the respective gearboxes 25L,25R. The gearboxes are bolted to respective electric motors 27L,27R, and to the chassis 29 of the tractor 10. The (two-stage) gearboxes provide a gear ratio between the motor and the road wheel of 30:1. The gearboxes provide a firm mounting and a good bearing spread for the wheel axle bearings.

Figure 3:
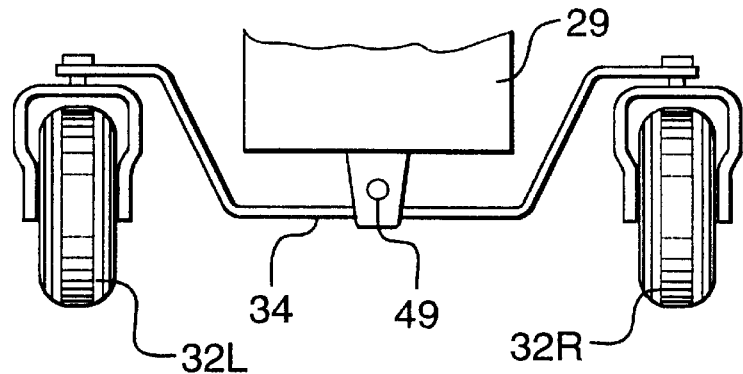
FIG. 3 is a rear elevation of the FIG. 2 tractor.
Figure 2:
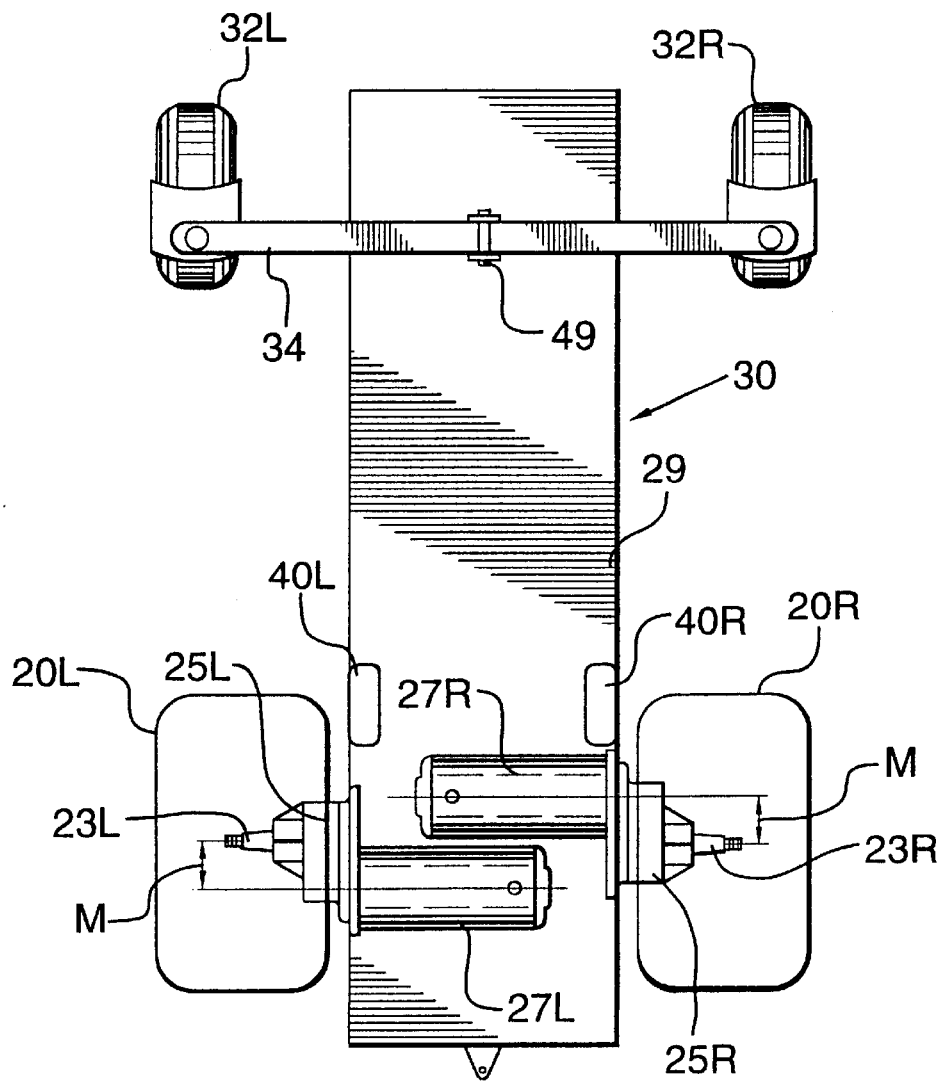
FIG. 2 is a corresponding view to FIG. 1 of another tractor, which also embodies the invention.

The tractor 30 of FIGS. 2 and 3 has the same arrangement of driven wheels as in FIG. 1, and the same reference numerals are used. However, in FIGS. 2 and 3 the non-driven wheels 32L,32R are mounted as castors. A cross-beam 34 carries swivel-able stirrups 36L,36R, in which the wheels are mounted.

Lawn and garden tractors generally have no suspension system as such: the tires of the wheels are soft enough to cope with such suspension motions as are called for.

The tractors of FIGS. 1 and 2 have no common drive axle, no final drive gears, and no differential to compensate for the wheels rotating a different speeds when the tractor is being steered around corners. Instead, the tractor has a motor speed control system, which will now be described.

Each wheel 20L,20R is provided with a respective speed sensor 40L,40R. This speed sensor may take the form of a revolution-counter, separate from the motor, or may take the form of a generator which rotates with the motor, and which supplies a voltage or frequency signal indicative of the speed of the wheel. Alternatively, the speeds of the DC motors can be derived from the current fluctuations as the armatures pass the poles of the motors. In any event, the speed sensor sends a signal indicative of the speed of the motor (and hence of the wheel) to a controller 43. The signal may be pulses, the frequency of which indicates motor speed, or the signal may be a voltage, the steady level of which indicates motor speed, or the signal may be in any other convenient form.

It is preferred that the speed is sensed from a parameter that is present in, and can be measured in, the power wires going to the motor. In that way, no separate wires are required for the sensor. Thus, it is preferred for the sensor to detect, for example, speed-proportional pulses in the current as the rotor of the motor sweeps the electrical poles: that can be done through the supply wires to the motor. Probably the simplest way of sensing speed is to measure the resistance of the field windings of the motor, which again can be done through the motor supply wires, without special wires to a sensor.

In FIG. 1, turning the steering wheel 18 is effective not only to swivel the steerable wheels but is effective also to change the status of a steering potentiometer 45 mounted on the steering column. In FIG. 2, there is no steering wheel: instead, steering is effected entirely electrically, by means of a joystick 47. Manipulation of the joystick again is effective to change the status of the steering potentiometer 45.

The output of the steering potentiometer provides a reference signal for comparing the speeds of the left and right motors. The designer of the system sets in a formula or algorithm such that when the steering wheel is turned through a particular angle, the driving wheels are set to rotate at speeds which differ by a particular differential speech. That is to say, the wheel on the outside of the curve is constrained to move at a faster speed than the wheel on the insides of the curve, and the wheel speeds are constrained to differ by a pre-determined amount.

In FIG. 1, this constraining of the wheels to rotate at different speeds ensures that the non-steerable, driven, wheels follow the steered, non-driven, wheels around a corner, just as if the tractor had been equipped with a mechanical differential gear. In FIG. 2, there is no steering wheel, and the differential speeds of rotation of the left and right wheels is the sole factor which causes and controls the steering motions of the tractor.

The behaviour of the FIG. 1 tractor is not always as if the tractor had been equipped with a mechanical differential gear. For example, when one driven wheel is on ice or other low friction surface, and the other wheel is on a normal friction surface, the differential speed control system ensures that the wheel on ice does not speed up, as would happen with a mechanical differential. The control system ensures that the difference in wheel speeds always corresponds to the desired turning radius, as set by the steering wheel or joystick, irrespective of the friction grip of the tires to the surface.

The speed control system automatically sets the power supplied to the motor to the value necessary to maintain the speed as dictated by the speed control potentiometer.

Similarly, if the tractor should encounter such an obstacle, for example, as when one wheel passes over a tree root or the like, that wheel does not slow down and then speed up; the control system momentarily feeds extra power to the motor to drive the wheel over the obstruction without losing speed, and then reduces the power to the motor as the obstruction passes, without the motor gaining speed.

The speed of the tractor may be set by the driver by means of a separate accelerator/brake control. The setting of this control defines the average of the speeds of the left and right wheels; the steering potentiometer defines whether the wheels are to rotate both at the same speeds, or at proportionately different speeds. Alternatively, instead of one control for vehicle speed and one for steering, the designer might provide two separate wheel speed controls, one for each wheel, which the driver can operate together or independently.

The tractor is equipped with a switch for changing between forward and reverse motion.

In the FIG. 1 tractor, manoeuvring is accomplished as in an ordinary front-wheel-steering, mechanical-rear-axle-differential equipped vehicle. Thus, the FIG. 1 tractor "feels like" a normally-steered vehicle. The difference in speeds between the left and right rear wheels is in fixed correspondence with the angle through which the steered front wheels are turned.

The FIG. 2 tractor steers in what seems an unnatural manner, which is quite unlike a conventional vehicle. On the other hand, the steering system of FIG. 2 makes the tractor highly manoeuvrable around obstacles. Also, the tractor can turn in very tight circles. Also, the tractor's manoeuvrability is not dependent on the friction of the surface remaining constant.

In FIG. 2, when the accelerator/brake control is set to move the tractor forward only very slowly, if at that time the steering is turned to a full-turn position, it can happen that the difference in the speeds of the wheels, as dictated by the steering potentiometer, makes one wheel turn in reverse. For example, if the accelerator/brake control is set to a forward speed corresponding to a wheel speed of say 10 rpm, and if the steering control requires a speed differential of say 26 rpm, then the left wheel turns at 23 rpm forwards, and the right wheel turns at 3 rpm in reverse. Equally, if the accelerator/brake control is set to zero, and the steering control is set to a full-turn position, the tractor will spin on its Yaw-axis.

If the FIG. 2 tractor should become bogged down in a patch of slippery ground, therefore, and the driver attempts different accelerator and steering manoeuvres in order to extricate the tractor, it can happen that the tractor comes out of the patch of slippery ground at an unpredictable angle. However, the tractor never moves with an unpredictable speed, so there is little safety problem associated with the FIG. 2 steering system. With a little practice, a driver soon becomes accustomed to the unusual steering behaviour, and from then on welcomes the extra dimensions of manoeuvrability it provides.

The FIG. 2 steering system with a mechanical differential drive would be impractical for a small tractor. The system can only be effectively controlled if the wheels are, or can be, constrained to move at pre-determined speeds.

It might be considered that the FIG. 2 steering system could be done non-electrically, by providing hydraulic drive motors, one to each wheel, and this could theoretically be done; however, an hydraulic system would be prohibitively expensive in the context of a lawn and garden tractor.

FIG. 3 shows the cross-beam 34 on which the castors 32L,32R are mounted. The beam is arranged for pivoting in the Roll-mode of the tractor about the swivel pin 49. When the tractor passes over uneven ground, the beam axle can follow such Roll-mode movement as may be required. The beam is cranked so that the pin 49 lies close to the ground, whereby the castors follow the movement over a favourable portion of the beam's arc of swivel.

In FIG. 1 and FIG. 2, it will be noted that, in respect of each of the electric drive motors 27L,27R, the axis of the armature of the drive motor lies parallel to the axle 23L,23R of the corresponding wheel 20L,20R. The motor armature is not co-axial with the wheel axle, however, but is offset therefrom.

The magnitude M of the offset between the motor armature axis and the wheel axle is important. Of course, the two wheels 20L,20R must be co-axial. The offset M should be large enough, in relation to the diameter D of the casings of the motors, that the two motors 27L,27R can be mounted side-by-side on the chassis: that is to say, the offset is large enough that the motors can be mounted overlapped one behind the other, when viewed in the longitudinal sense relative to the tractor.

If the chassis of the lawn and garden tractor were wide, ie wider than the length of the two motors put together, then it would not matter whether the motors were overlapped; but since, in a lawn and garden tractor, the chassis is narrow compared with the length of the electric motors (that is a common characteristic of a lawn and garden tractor) it is very advantageous that the offsets as described permit the overlapping arrangement.

The double reduction gearboxes 25L,25R are arranged so that the wheel axle and the motor armature are parallel. Such a gear arrangement involves a relatively modest expense, as compared with, for instance, the expense of a gear-box that had to accommodate a crown bevel gear to provide an angle difference between the armature and the axle.

It is recognised that the large offset M allows the wheels 20L,20R to be co-axial, but allows also the physical bulk of the motors to be accommodated in the relatively narrow chassis. The combined motor/gearbox unit as illustrated is available as a proprietary unit, of excellent economy and service reliability. The road wheels are mounted directly on the gearbox output shaft, and so sturdiness is important. If the drive system had to be designed around, say, a chain drive, the limitations of that would be much more restrictive on the designer.

It is one of the features of the invention is that the two motors are each driven at pre-determined speeds. When the tractor is moving in a straight line, power is supplied to the left and right motors so as to keep both of them rotating at the same speed, irrespective of variations in the ground surface etc. When the tractor is moving around a curve, power is supplied to the left and right motors so as to keep them rotating at some pre-determined ratio of speeds.

When more power is required to keep the motor turning at the desired rpm—when, for example, one tractor wheel encounters an obstacle—so the power supplied to the motor increases. Cut-outs are included in the controller to prevent the extra current from rising so high as to cause damage. However, the cut-outs are time-dependent: an electric motor can withstand considerable current for a short period, and can withstand very high current for periods of a few seconds.

The control system as described makes use of regenerative braking. An electric vehicle has the characteristic that a large proportion of its weight is taken by batteries. Therefore, when one or both of the wheels is over-running its respective motor, the inertia of the vehicle can be considerable, even though the vehicle might be moving quite slowly. Therefore, since the braking duty can be more onerous, regenerative braking can be more worthwhile, than on a corresponding non-battery vehicle.

Electric motors in general have substantial capability to be supplied with very high current for short periods, and the designer should see to it that the capacity for substantial overload for short periods is provided. The designer will generally set the voltage to be used on the vehicle at 36 or 48 volts, and may arrange for short-lived current of 100 amps or even more at that voltage.

The tractor may be used with different attachments, such as a grass cutter, a snow plough, a snow blower, a tippable scoop or wheelbarrow for carrying and dumping loads, etc.

Another useful item that can be included on the tractor is the type of implement known as a WeedEater ™ in which a plastic wire spins at high speed. A normal mains-voltage model can be used if a suitable voltage inverter is provided on the tractor. It is very simple and convenient also to provide a rack or hook for the WeedEater on the tractor. In his task of cutting a large area of grass, therefore, the driver can break the task up into periods of sitting on the tractor and periods of using the WeedEater, which breaks up both tasks, and takes away much of the "chore" character of both tasks.

The motor controls include two-quadrant choppers capable of accelerating and decelerating the motors, making the tractor highly responsive to operator control. Current and voltage feedback circuits improve the response of the unit to asymmetric variations in drive-wheel torque. The capacity for high peak current enables rapid motor acceleration. The chopper is a high-efficiency power semi-conductor device which, in combination with a motor and free-wheeling diode, behaves like a variable output voltage DC-to-DC converter. By varying the effective output voltage of this converter, the operator can vary the speed of the motor. A "one-quadrant" chopper is capable of accelerating a motor in one direction only: a four-quadrant chopper is capable is of accelerating and decelerating a motor in both directions.

The system provides that the speed of the wheels is determined purely by the electrical settings of the controls. The motors draw current as required, to maintain speed. This results in smooth progressive operation, with no jerks.

Figure 4:
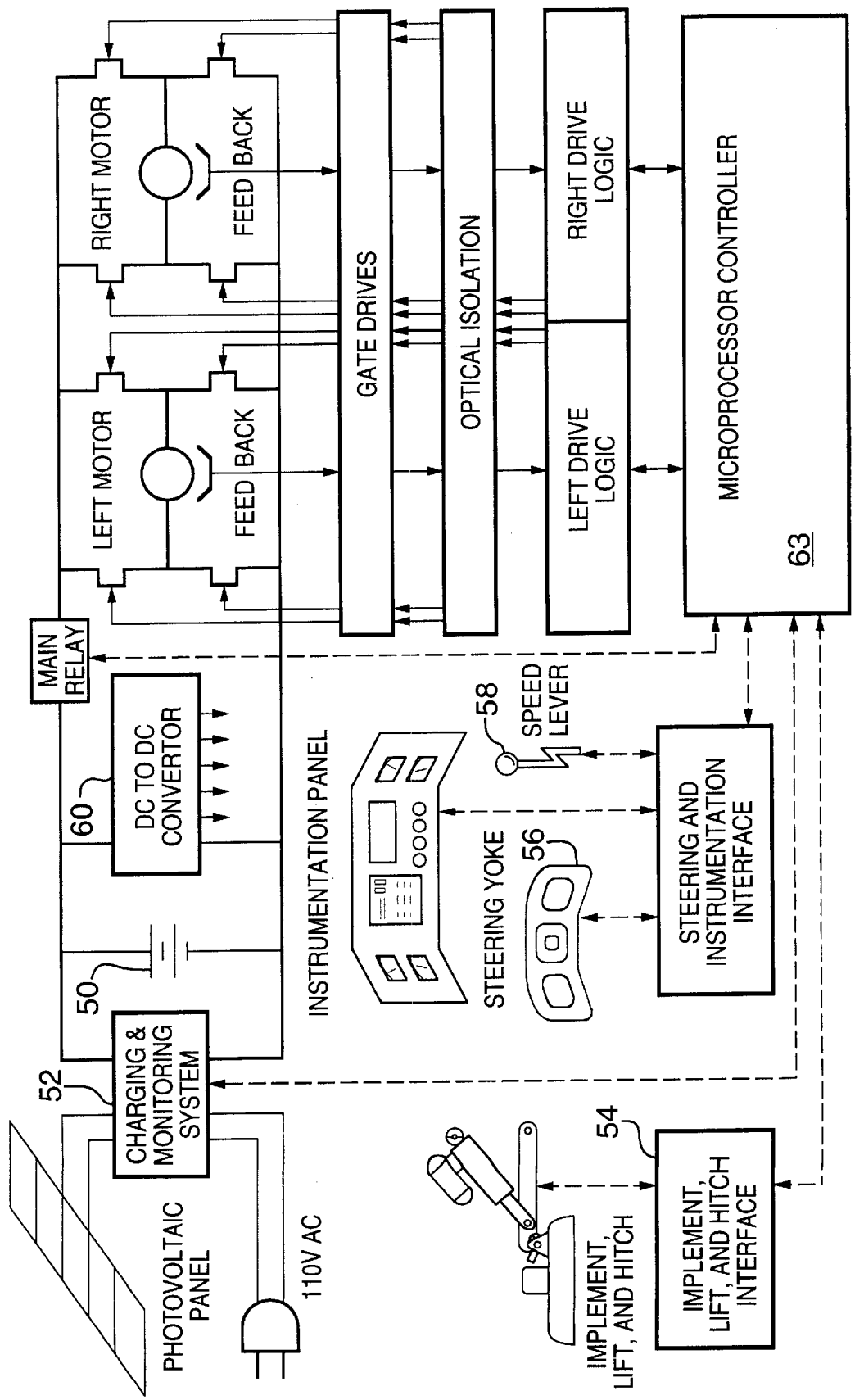
FIG. 4 is a block diagram of a control system for the FIG. 2 tractor.

FIG. 4 shows the electrical arrangement of the tractor, in diagrammatic form. The batteries 50 of the tractor may be recharged by plugging into a mains-or solar-powered charger 52, or as available. The tractor includes means 54 for hitching and unhitching accessories such as a grass-cutter, snowblower, or the like.

The tractor may have a steering yoke 56 to control left/right steering, a separate forward/reverse switch to control direction, and a separate speed lever 58 to control speed. Alternatively, all three of these functions can be provided by a single joystick. The single joystick may be set up so that fore/aft motion of the joystick controls both direction and speed, and so that left/right motion of the joystick controls steering.

The joystick on the tractor may be duplicated by (or even replaced by) a remote-control joystick, which operates the tractor by radio or other transmissions. The electrical control system can be arranged to require only a non-active potentiometer output from the joystick, which can easily be duplicated by radio control.

The control of power to the motors is done by chopping the current at programmed intervals, and at a programmed frequency. Power is supplied to the motor therefore via what is, in effect, a DC-to-DC converter 60. The relationship between frequency and on/off chopping ratio is controlled by the microprocessor 63 so as to maximise efficiency of the drive system, ie to keep the drive current at a minimum for a particular setting of the joystick.

The speed control system as described may also be used to control a four-wheel drive tractor. A single joystick (on board or remote) can even be used in that case also. The control system simply determines at what speed each wheel should be running, given the inputs from the joystick, and regulates the current to the motors accordingly. Preferably, mechanically-separate motors are provided, one to each wheel.

When all four wheels are driven, provision may also advantageously be made for the tractor to be steered and driven in crab-fashion: that is to say, in which the back wheels and the front wheels are both turned (or both made to rotate at differential speeds) in order to make the tractor move sideways. Crab steering can be useful when operating the tractor on the side of a hill, for example.

In place of the proprietary motor/gearbox unit as illustrated, the drive unit may be a high-torque motor without a gearbox, or a stepper motor, with or without a gearbox. A stepper motor of course is very readily controlled as to its speed of rotation.

When the tractor encounters a hill, theoretically no change of the joystick position is needed to make the tractor go uphill. However, people naturally feel the need to increase the throttle setting when going up a hill. To improve the "feel" of the drive system, therefore, a little bias may be added in the controls such that an equal resistance to both wheels (indicating a hill) requires a slight extra pressure on the joystick.

The drive motors preferably should be of the type which can exert a high torque at low or zero speed. The need for the tractor to have energy-absorbing brakes can be reduced in that case. (The tractor should have at least a parking brake, for safety reasons.)

Some of the aspects of the drive systems as described are not suitable for road-going vehicles, for which there are safety requirements for a mechanical connection between the steering wheel and the road wheels. The system is most suited to a small tractor, wherein the chassis of the tractor is relatively narrow as compared with the size of the drive motors, and wherein there is little requirement for suspension. The drive system as described also has limitations in that, without drive transmission shafts, gears, etc, there is a practical maximum to the level of electrical power that can be conveniently fed to the wheels, whereby the system might not be appropriate for a vehicle larger than a lawn/garden tractor. However, as vehicle-drives with no mechanical drive-connection become more reliable, that lack of appropriateness may dissappear. Another type of small vehicle wherein steering control can be allowed to be independent of mechanical connections is a motorized wheel-chair, and the invention may be applied to that.

What is claimed is:

1. Motor-driven vehicle, having left and right co-axial drive-wheels, wherein:

the left drive-wheel has a left rotary drive-axle, and the right drive-wheel has a right rotary drive-axle;

the vehicle includes left and right drive-motors;

the left and right drive-motors have no mechanical drive-connection therebetween;

the left and right drive-axles have no mechanical drive-connection therebetween;

the left drive-motor includes a left motor-housing that is of generally cylindrical form, having a cylindrical diameter DL and having an axial length AL;

the right drive-motor includes a right motor-housing that is of generally cylindrical form, having a cylindrical diameter DR and having an axial length AR;

the vehicle includes a left drive-train, which comprises a mechanical drive-connection between the armature of the left drive-motor and the left drive-axle;

the vehicle includes a right drive-train, which comprises a mechanical drive-connection between the armature of the right drive-motor and the right drive-axle;

and the left and right drive-motors are mounted in the vehicle with their housings in an axis-parallel, spaced-apart, side-by-side, relationship.

2. Vehicle of claim 1, wherein the arrangement of the vehicle is such that a portion of the axial length AL of the left drive-motor housing lies to the right of the longitudinal axis of the vehicle, and is such that a portion of the axial length AR of the right drive-motor housing lies to the left of the longitudinal axis of the vehicle.

3. Vehicle of claim 1, wherein the distance apart of the left and right armature axes, measured perpendicularly to their axes, is greater than (DL+DR)/2.

4. Vehicle of claim 3, wherein the left and right drive-motors are spaced apart in the direction of the longitudinal axis of the vehicle, and the axes of their armatures lie at the same horizontal height, one ahead of the drive-axles, and the other behind.

5. Vehicle of claim 1, wherein:

the vehicle includes a left gearbox in a left gearbox-housing, having a left gearbox-output-shaft;

the vehicle includes a right gearbox in a right gearbox-housing, having a right gearbox-output-shaft;

the left drive-train comprises a left gear-train in the left gearbox, which connects the left drive-motor to the left gearbox-output-shaft;

the right drive-train comprises a right gear-train in the right gearbox, which connects the right drive-motor to the right gearbox-output-shaft;

the left motor-housing and the left gearbox-housing are integrated into a common, structurally-unitary, left housing;

the right motor-housing and the right gearbox-housing are integrated into a common, structurally-unitary, right housing;

the arrangement of the left housing and the right housing in the vehicle is such that the left gearbox-output-shaft and the right gearbox-output-shaft are in coaxial alignment.

6. Vehicle of claim 5, wherein:

the left drive-motor is disposed in the left common housing with the axis of its armature parallel to the axis of the left gearbox-output-shaft, but displaced or off-set therefrom a distance ML in the direction of the longitudinal axis of the vehicle, the right drive-motor is disposed in the right common housing with the axis of its armature parallel to the axis of the right gearbox-output-shaft, but displaced or off-set therefrom a distance MR in the direction of the longitudinal axis of the vehicle.

7. Motor-driven vehicle, having left and right co-axial drive-wheels, wherein:

the vehicle includes a left drive-motor, housed in a left motor-housing, for driving the left drive-wheel;

the vehicle includes a right drive-motor, housed in a right motor-housing, for driving the right drive-wheel;

the vehicle includes a left gearbox in a left gearbox-housing, having a left gearbox-output-shaft;

the vehicle includes a right gearbox in a right gearbox-housing, having a right gearbox-output-shaft;

the left gearbox-output-shaft is mounted for rotation in bearings carried in the left gearbox-housing;

the right gearbox-output-shaft is mounted for rotation in bearings carried in the right gearbox-housing;

the left gearbox includes a left gear-train, which connects the left drive-motor to the left gearbox-output-shaft;

the right gearbox includes a right gear-train, which connects the right drive-motor to the right gearbox-output-shaft;

the left motor-housing and the left gearbox-housing are integrated into a common, structurally-unitary, left housing;

the right motor-housing and the right gearbox-housing are integrated into a common, structurally-unitary, right housing;

the arrangement of the left housing and the right housing in the vehicle is such that the left gearbox-output-shaft and the right gearbox-output-shaft are in coaxial alignment;

the left driven-wheel is mounted directly upon, and is so mounted as to be structurally-unitary with, the left gearbox-output-shaft;

the right driven-wheel is mounted directly upon, and is so mounted as to be structurally-unitary with, the right gearbox-output-shaft.

8. Vehicle of claim 7, wherein the drive-wheels are provided with respective tires, which are so soft and resilient that the tires provide vehicle suspension movement in respect of the drive-wheels.

9. Vehicle of claim 7, wherein the drive-wheels are so mounted to the respective gearbox-output-shafts as to be detachable therefrom for servicing.

10. Vehicle of claim 7, wherein the arrangement of the vehicle is such that the left and right gearbox-output-shafts have no mechanical drive-connection therebetween, the left and right drive-motors have no mechanical drive-connection therebetween.

11. Vehicle of claim 7, wherein the left and right gear-trains are each of the unchangeable, fixed-ratio type.

12. Vehicle of claim 7, wherein the left common housing is structurally separate from the right common housing, and both common housings are fixedly secured to the frame of the vehicle.

13. Vehicle of claim 7, wherein the said drive-wheels are so mounted in the vehicle as to be non-steerable.

14. Vehicle of claim 8, wherein:

the drive-wheels are so mounted to the respective gearbox-output-shafts as to be detachable therefrom for servicing;

the arrangement of the vehicle is such that the left and right gearbox-output-shafts have no mechanical drive-connection therebetween, the left and right drive-motors have no mechanical drive-connection therebetween;

the left and right gear-trains are each of the unchangeable, fixed-ratio type;

the left common housing is structurally separate from the right common housing, and both common housings are fixedly secured to the frame of the vehicle;

and the said drive-wheels are so mounted in the vehicle as to be non-steerable.

15. Motor-driven vehicle, wherein:

the vehicle includes left and right non-steered co-axial drive-wheels, and left and right steered wheels;

the vehicle includes a mechanical steering-actuator, which is arranged for steering actuation movement under the manual control of an operator of the vehicle;

the steered wheels are linked mechanically to the steering-actuator by a mechanical steering linkage, for effecting steering movements of the steered wheels proportional to an actuation movement of the actuator, an actuation movement AM being effective to steer the vehicle at a turning radius TR;

the vehicle includes left and right electric drive-motors;

the left and right drive-motors have no mechanical drive-connection therebetween;

the left and right drive-wheels have no mechanical drive-connection therebetween;

the vehicle includes a left drive-train, which comprises a mechanical drive-connection between the armature of the left drive-motor and the left drive-wheel;

the vehicle includes a right drive-train, which comprises a mechanical drive-connection between the armature of the right drive-motor and the right drive-wheel;

the vehicle includes a battery pack;

the vehicle includes an electrical speed-control-unit;

the speed-control-unit includes a means for receiving power from the battery pack, and a means for feeding required amounts of that power to the left and right drive-motors;

the vehicle includes left and right speed-sensors, for sensing the respective rotational speeds of the two drive-wheels, and for sending to the speed-control-unit signals indicative of the instant values of those rotational speeds;

the vehicle includes an operable speed-actuator, for setting a respective desired speed of each drive-motor, whereby the speed-actuator is effective to set a desired speed of the vehicle;

the speed-control-unit is effective, in response to the signal from the speed sensor of the left drive wheel indicating that the left drive wheel is rotating at less than the desired speed for that wheel, to increase the power from the battery to the left drive-motor;

the speed-control-unit is effective, in response to the signal from the speed sensor of the right drive wheel indicating that the right drive wheel is rotating at less than the desired speed for that wheel, to increase the power from the battery to the right drive-motor;

the vehicle includes an electrical steering-control-unit;

the steering-control-unit is connected to the speed-control-unit, and the steering-control-unit is connected also to the mechanical steering-actuator;

the steering-control-unit is effective to transpose an actuation movement AM of the steering actuator to turn the vehicle to the left into a differential rotational velocity between the left drive-wheel and the right drive-wheel, whereby the right drive-wheel rotates faster than the left drive-wheel by an amount commensurate with the turning radius TR;

the steering-control-unit is effective to transpose an actuation movement AM of the steering actuator to turn the vehicle to the right into a differential rotational velocity between the left drive-wheel and the right drive-wheel, whereby the left drive-wheel rotates faster than the right drive-wheel by an amount commensurate with the turning radius TR.

16. Vehicle of claim 15, wherein:

the mechanical steering linkage includes a rotary steering-column;

the steering-control-unit includes a electrical rotary-position-sensor;

the electrical rotary-position-sensor is so mounted in relation to the steering column as to be actuable by mechanical movement of the steering-actuator.

17. Vehicle of claim 15, wherein:

the vehicle includes a left actuable regenerative braking means, which is effective, if the left wheel is over-running the left drive-motor, to actuate regenerative braking in respect of the left drive-motor;

the vehicle includes a right actuable regenerative braking means, which is effective, if the right wheel is over-running the right drive-motor, to actuate regenerative braking in respect of the right drive-motor.

18. Electric-powered vehicle, having a vehicle frame, wherein:

the vehicle includes left and right drive-wheels;

the left and right drive-wheels lie in a co-axial relationship to each other;

the vehicle includes left and right electric drive-motors;

the left and right drive-motors have no mechanical drive-connection therebetween;

the left and right drive-wheels have no mechanical drive-connection therebetween;

the left drive-motor is mechanically drive-coupled to the left drive-wheel, and the right drive-motor is mechanically drive-coupled to the right drive-wheel;

the vehicle has no mechanical steering;

the vehicle includes a battery pack;

the vehicle includes an electrical speed-and-steering-control-unit;

the control-unit includes a means for receiving power from the battery pack, and a means for feeding required amounts of that power to the left and right drive-motors;

the vehicle includes left and right speed-sensors, for sensing the respective rotational speeds of the two drive-wheels, and for sending to the control-unit signals indicative of the instant values of those rotational speeds;

the vehicle includes an operable speed-actuator, for setting a respective desired speed of each drive-motor, whereby the speed-actuator is effective to set a desired speed of the vehicle;

the control-unit is effective, if the signal from the speed sensor of the left drive wheel indicates that the left drive wheel is rotating at less than the desired speed for that wheel, to increase the power from the battery to the left drive-motor;

the control-unit is effective, if the signal from the speed sensor of the right drive wheel indicates that the right drive wheel is rotating at less than the desired speed for that wheel, to increase the power from the battery to the right drive-motor;

the vehicle includes an operable steering-actuator, for steering the vehicle at a desired turning radius;

the control-unit is effective to steer the vehicle by rotating one of the drive-wheels at a faster rate than the other drive-wheel, responsive to manual operation of the steering-actuator;

the vehicle includes at least one non-driven wheel;

the non-driven wheel is mounted on a king-pin of the vehicle, which is so arranged that the non-driven wheel can undergo castor-swivelling motion with respect to the vehicle.

19. Vehicle of claim 18, wherein:

the said non-driven wheel and king-pin comprise a left non-driven-wheel and left king-pin, and the vehicle further includes a corresponding right non-driven wheel and right king-pin;

the vehicle includes a suspension means for the non-driven wheels;

the suspension means includes a beam, and the left and right king-pins are secured to the beam;

the suspension means includes a pivot connection between the beam and the frame of the vehicle;

the pivot connection is so arranged that the beam is free to pivot in Roll-mode relative to the frame;

and the pivot connection is so arranged as to constrain the beam against pivoting movement of the beam relative to the frame in the Yaw-mode.

20. Vehicle of claim 18, wherein:

the left and right non-driven wheels have a rolling-diameter D, in operation of the vehicle on the ground;

the said pivot connection that permits Roll-mode pivoting of the beam has a pivot-axis which lies at a horizontal height H above the ground;

and the height H is smaller than the diameter D.

21. Vehicle of claim 18, wherein the operable speed-actuator and the operable steering-actuator comprise respective electrical input-devices, which are disposed in a four-way joystick configuration.

* * * * *